US009405831B2

(12) United States Patent
Shuster

(10) Patent No.: US 9,405,831 B2
(45) Date of Patent: Aug. 2, 2016

(54) AVOIDING MASKED WEB PAGE CONTENT INDEXING ERRORS FOR SEARCH ENGINES

(76) Inventor: Gary Stephen Shuster, Fresno, CA (US)

( * ) Notice: Subject to any disclaimer, the term of this patent is extended or adjusted under 35 U.S.C. 154(b) by 1229 days.

(21) Appl. No.: 12/425,269

(22) Filed: Apr. 16, 2009

(65) Prior Publication Data

US 2009/0265342 A1 Oct. 22, 2009

Related U.S. Application Data

(60) Provisional application No. 61/045,491, filed on Apr. 16, 2008.

(51) Int. Cl.
G06F 7/00 (2006.01)
G06F 17/00 (2006.01)
G06F 17/30 (2006.01)

(52) U.S. Cl.
CPC ................. G06F 17/30864 (2013.01)

(58) Field of Classification Search
USPC .......................................................... 707/696
See application file for complete search history.

(56) References Cited

U.S. PATENT DOCUMENTS

| | | | |
|---|---|---|---|
| 6,192,398 B1 | 2/2001 | Hunt | |
| 6,269,361 B1 | 7/2001 | Davis et al. | |
| 6,282,548 B1* | 8/2001 | Burner et al. | |
| 6,438,125 B1 | 8/2002 | Brothers | |
| 6,547,829 B1* | 4/2003 | Meyerzon et al. | 715/234 |
| 6,560,639 B1 | 5/2003 | Dan et al. | |
| 6,744,452 B1* | 6/2004 | McBrearty et al. | 715/853 |
| 6,842,761 B2 | 1/2005 | Diamond et al. | |
| 7,003,528 B2 | 2/2006 | Dan et al. | |
| 2001/0051927 A1 | 12/2001 | London et al. | |
| 2002/0073167 A1 | 6/2002 | Powell et al. | |
| 2003/0023664 A1 | 1/2003 | Elmer | |
| 2003/0191737 A1 | 10/2003 | Steele et al. | |
| 2004/0054661 A1 | 3/2004 | Cheung et al. | |
| 2004/0133564 A1 | 7/2004 | Gross et al. | |
| 2004/0143564 A1 | 7/2004 | Gross et al. | |
| 2004/0177015 A1 | 9/2004 | Galai et al. | |
| 2005/0050028 A1* | 3/2005 | Rose et al. | 707/3 |
| 2006/0004717 A1 | 1/2006 | Ramarathnam et al. | |
| 2006/0020587 A1 | 1/2006 | Kausik | |
| 2006/0184500 A1* | 8/2006 | Najork et al. | 707/1 |
| 2009/0024605 A1* | 1/2009 | Yang | 707/5 |
| 2009/0228439 A1* | 9/2009 | Manolescu et al. | 707/3 |
| 2009/0265342 A1* | 10/2009 | Shuster | 707/5 |

* cited by examiner

Primary Examiner — Alex Gofman
Assistant Examiner — Muluemebet Gurmu
(74) Attorney, Agent, or Firm — Sherrie Flynn; Coleman & Horowitt, LLP

(57) ABSTRACT

Multiple non-host client sites provide cached user copies of web pages and/or web content, or summaries thereof, to a server. Obtaining data from non-host sources for indexing purposes avoids masked web page content indexing errors for search engines. The server aggregates, summarizes and indexes the web pages and/or web content in an index of cached content, in conjunction with updating, generating and storing a search index using an indexing agent such as a web crawler or spider. In response to receiving search requests from end users, the search engine uses comparisons between the index of cached content and the index of crawled content to identify potential page masking errors for specific search results and appropriately rank or omit results with a high risk of masking errors in a search result list.

25 Claims, 10 Drawing Sheets

AVOIDING MASKED WEB PAGE CONTENT INDEXING ERRORS FOR SEARCH ENGINES

CROSS-REFERENCE TO RELATED APPLICATION

This application claims priority pursuant to 35 U.S.C. §119(e) to U.S. provisional application Ser. No. 61/045,491, filed Apr. 16, 2008, which is hereby incorporated by reference, in its entirety.

BACKGROUND

1. Field

This application relates to computer search engines, and more particularly to avoiding masked web page content indexing errors.

2. Description of Related Art

Obtaining useful data parameters for generating search indexes used by search engines has become increasingly important for designers of search engines. Search engines are being used by computer users of all ages and abilities, and endeavor to provide information correctly matched to the users' search requests.

Generally, search engines use corresponding search indexes to obtain search results for these computer users. In turn, search engines use a variety of techniques to obtain data for these search indexes. For example, some search engines automatically generate their listings using software known as "crawlers" or "bots" or "spiders". Generally speaking, crawlers find and interact with web pages, request the web page from the host for the web page, read the web page, and follow links on each web page to other pages within the web site. The read information may consist of words, terms, network addresses, or other parameters useful for obtaining search results desired by computer users. After obtaining these parameters, crawlers provide their results for indexing in a search index available to the search engine. The search index may include the web pages themselves or summaries of the web pages' content. Finally, search engine software may process the web pages or the summarized content in the search index to retrieve search results and rank the pages according to a specific algorithm.

Other search engines rely upon hosts' descriptions of web pages or web sites to generate listings in the search index. The search engine software searches only for matches in the descriptions submitted by the hosts, which may be prepared by a human operator. In addition, some search engines combine crawler-based search indexes with human-based search indexes to generate hybrid search indices.

All of these methods generate search indexes by reading web pages on the hosts' servers or databases, or by relying upon the hosts' descriptions of the content of their web pages. In either situation, these search engines cannot avoid content errors caused by the hosts themselves. Oftentimes, hosts seek to generate higher ranking scores on popular search engines by responding to a crawler's request with false copies of web pages, or by submitting false descriptions of a web page's content to a human-based search engine. The hosts' actual content is therefore said to be "masked" by misleading information provided in response to a crawler request. Inaccurate indexing caused by hosts providing deliberately inaccurate data about hosted content may be referred to as a masked web page indexing error.

Accordingly, it is desirable to provide methods and systems to avoid these masked web page content indexing errors, thereby generating more useful results for search requests by computer users.

SUMMARY

Masked web page content indexing errors are avoided by obtaining cached user copies of web pages from sources other than the hosts of the web pages. The hosts of the web pages may be indicated by the uniform resource locator (URL), network address associated with each web page or some other identifier. Sources other than the hosts of the web pages may include consumers of the information on each of the web pages or non-indexing sources that do not have an interest in either providing erroneous data to "spiders" or "bots" used in creating indexes for search engines or submitting false descriptions of their web page's content. Generally, such sources do not publish the cached web pages, which are stored on a private file system that is not publicly accessible using a URL or other address. User sources that are not the hosts of the web pages may acquire user copies of the web pages from the hosts and store (cache) the web pages in a non-public file system. By acquiring these cached user copies of web pages from such sources, the method and system avoids erroneous search results caused by hosts of web pages that "mask" their web pages with false content.

It should be understood, however, that use of cached content from non-public sources thwarts the systematic acquisition of content to process for an index that can be accomplished using an indexing agent such as a web crawler, spider, or "bot." In addition, the private sources that cache web content should not be configured merely as indexing agents in disguise. If the search engine operator desires to operate a disguised indexing agent, it would be simpler to do so directly. In fact, search engine operators generally do not desire to operate disguised indexing agents, because doing so creates a definite risk of adverse technical or legal consequences. Therefore a barrier to use of privately cached content arises, in that such content may include a random or haphazard collection of content collected as a consequence of casual web surfing or other private use not intended for indexing purposes. The non-public cached content is not assembled in a systematic fashion, and will not include all of the content otherwise available to an indexing application. Relying exclusively on such private caches will likely result in a search index substantially smaller than generated by a traditional indexing agent, for comparable resources expended. For at least these reasons, such private caches of web content are an unexpected and surprising source for use in generating a search index.

According to various embodiments of the invention, systems and methods for indexing web pages on the Internet are provided. The method includes: accessing a web page to create a first index of the web page; receiving a cached copy of the web page from a client; generating a second index of the web page using the cached copy; and ranking the web page based on a comparison between the first and second indexes of the web page, meaning using information obtained from the comparison to rank the web page in query results lists, including omitting any reference to the page from a results list if the first and second indexes for the page are not the same or similar.

The method may also include: generating an updated index based on the comparison between the first and second indexes of the web page; and generating a search result based on the updated index for at least one client. The cached copy of the web page from the client may be identified by an address that designates a network address, which may be in a secured private file system, different from the web page. The cached copy may include a uniform resource locator (URL) for the original web page, a network address, and one or more key terms. The URL may be used to correlate data from the second index to data from the first index. The second index may be generated by summarizing the cached copy of the web page. The second index may also be generated by aggregating a plurality of cached copies of the web page from one or more clients.

In one embodiment, the popularity for each of the web pages is measured by counting a number of the cached user copies received. In yet another embodiment, the method also include distributing an application to the client. The application is configured to operate on computer system of the client and to periodically transmit the cached copy of a web page on the user's computer system to a server. Each cached copy of the web page may be summarized prior to it being sent to the server.

In yet another one embodiment, a software similar to a crawler may be used to obtain cached user copies of web pages from user sources that obtain user copies of web pages from the web pages' hosts and store the user copies in an associated private cache. The software may be executed on a server. This quasi-crawler transmits the cached user copies to a server for indexing on the search engine's database. Instead of, or in addition to, obtaining data parameters for the search index by requesting web pages from host web servers, the crawler requests cached user copies from sources that are not affiliated with the hosts of the web servers.

In still another one embodiment, software may be used that prompts non-host clients (e.g., clients operated by content consumers of hosted data) to allow an application to be downloaded on the non-host client computer systems. In this arrangement, the application periodically sends the cached user copies or summaries of the cached user copies for indexing on the search engine's database. Again, this arrangement avoids errors resulting from information requests directed to the hosts themselves.

A more complete understanding of the method and system for avoiding masked web page content indexing errors for search engines will be realized by one of ordinary skill in the art, as well as a realization of additional advantages and objects thereof, by considering the following detailed description. Reference will be made to the appended sheets of drawings, which will first be described briefly.

BRIEF DESCRIPTION OF THE DRAWINGS

Like numerals refer to like parts throughout the several views of the drawings.

DETAILED DESCRIPTION OF VARIOUS EMBODIMENTS

The present method and system avoids masked web page content indexing errors for search engines. One of ordinary skill in the art will find that there are a variety of ways to design a client or server architecture. Therefore, the method and system disclosed herein is not limited to a specific client or server architecture. For example, summarizing cached user copies of web pages may be performed at the client or server level. For further example, it may be advantageous to perform calculations and processor commands at the client level, thereby freeing up server capacity and network bandwidth.

Figure 1:
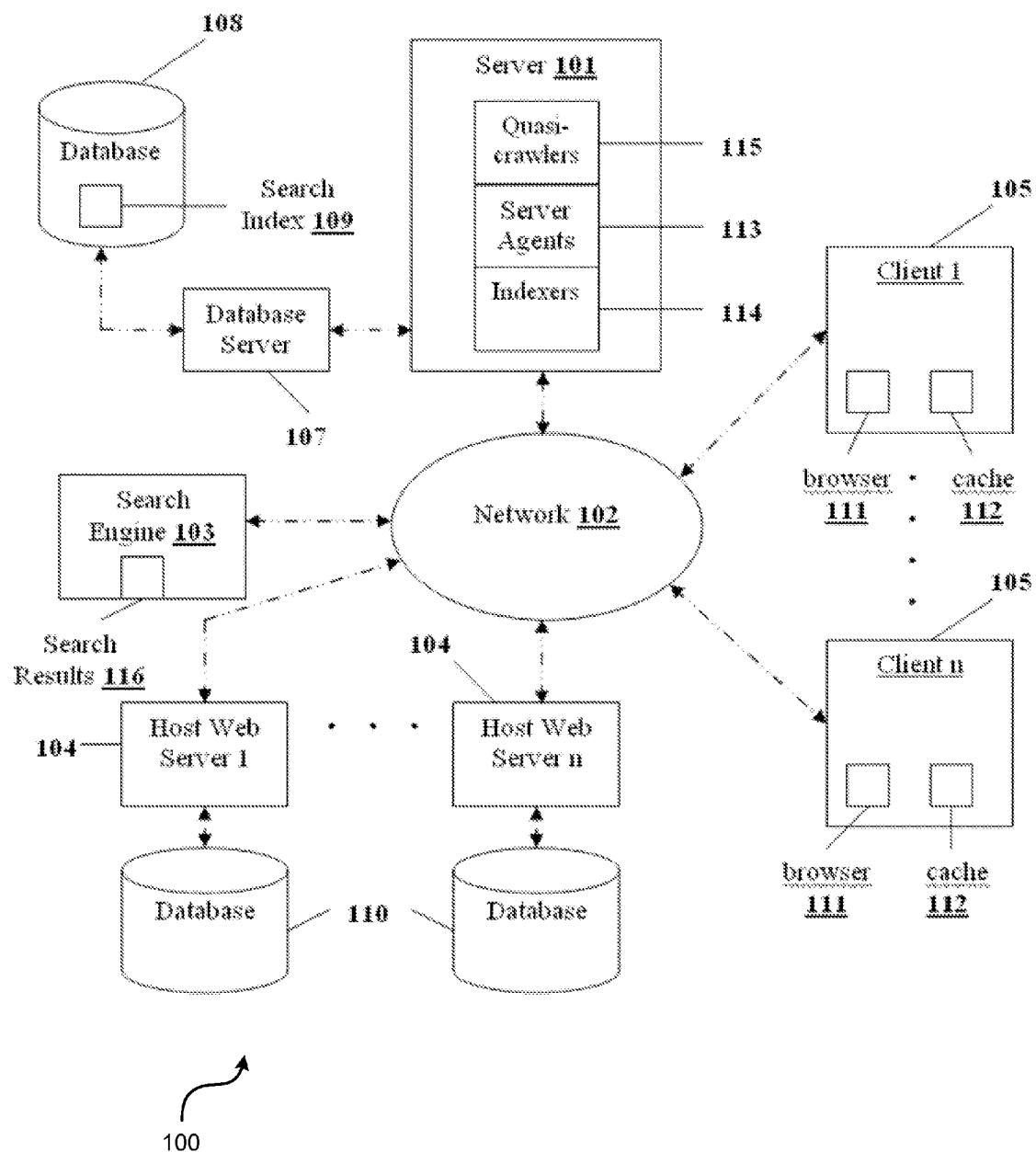
FIG. 1 illustrates an example of a general architecture of a system for avoiding masked web page content indexing errors and its environment.

Referring to FIG. 1, a system 100 for avoiding masked web page content indexing errors may comprise a server 101 communicating through a network 102 with a search engine 103, host web servers 104 and client sites 105 (or user sources) operated by end users. The server 101 may comprise various applications and may be connected to a database server 107 and database 108 to store data used in indexing web sites for search engines. Oftentimes the indexing data is referred to as a search index 109. In another arrangement, the server 101 may implement the application's algorithms in firmware or other non-volatile memory. The indexing data stored on the database 108 may be arranged in various formats, designed specifically to be used with an algorithm implemented on the search engine 103. The server 101 may be configured to connect to and communicate via network 102, which may comprise a wide area network, for example, the Internet, or other communications network or combinations of networks.

The client sites 105 may comprise a personal computer, portable computers, a compact player or a cell phone or digital assistant. The host web servers 104 store and serve data and software to the client sites 105. The host web servers may store web pages and/or web content on attached databases 110, such as on a local disk cache. The client sites 105 may include software or firmware that is configured to work cooperatively with software or firmware running on the host web servers 104. Generally, the client sites 105 may use web browsers 111 or other access applications to access and display data and software from the host web servers 104, and may store copies of web sites in a cache 112.

The client sites should not operate search indexing agent applications that crawl or locate web content for indexing, and therefore in the first instance the clients access and cache web content for reasons other than building a search index. Use of the cached content from the client sites for indexing purposes as described herein should be secondary to the initial or primary purpose for accessing and storing the content, in the first instance. For example, the client sites may operate web browsers that access web content through casual web surfing performed by their respective users. Therefore to provide an adequately large database of privately cached web content, numerous client sites may be required. For example, hundreds, thousands, tens of thousands, or more participating client sites may be desirable, depending on the amount of content that is to be screened for page masking errors. Methods as described herein may be applied to limit the amount of content that is screened for errors, which may help reduce the number of client sites required.

In an example embodiment, the server 101 includes server agents 113, indexing applications 114 and various other applications to ensure communication of data between the server 101 and the network 102, as well as between the server 101 and the database server 107. In another arrangement, the database server 107 may be connected to the network 102 instead of directly connected to the server 101. The server 101 is configured to communicate through the network 102 with client sites 105, a search engine 103 and host web servers 104. To obtain indexing data for use with the search engine 103, the server agents 113 may be used to communicate with the host web servers 104 to locate and request web pages, read the web pages and transmit the web pages back to the server 101. As discussed above, this type of indexing agent may be referred to as a crawler. A special crawler, herein called a quasi-crawler, may be specially configured to obtain cached user copies from non-host client sites. A specific algorithm may be coded as the application to be executed on the server 101. The server 101 may also obtain indexing data by allowing the host web servers 104 to submit summaries of their web pages' content. The server agents 113 may therefore obtain indexing information from crawlers, quasi-crawlers 115 that obtain data from client sites 105 that have obtained copies of web pages from host web servers 104 and the hosts of the host web servers 104 themselves.

The search engine 103 may be a specialized application server configured to scan a search index and return a list of ranked uniform resource locators (URLs). Various proprietary search engines have been developed that scan web pages for URLs, network addresses, key terms, number of visits, and numerous other variables. The search engines further developed complex algorithms that weigh these variables in order to return the most relevant search results 116. Examples of search engines include Google®, MetaCrawler®, Yahoo®, MSN Search®, AltaVista®, Lycos®, Ask® and others.

Figure 2:
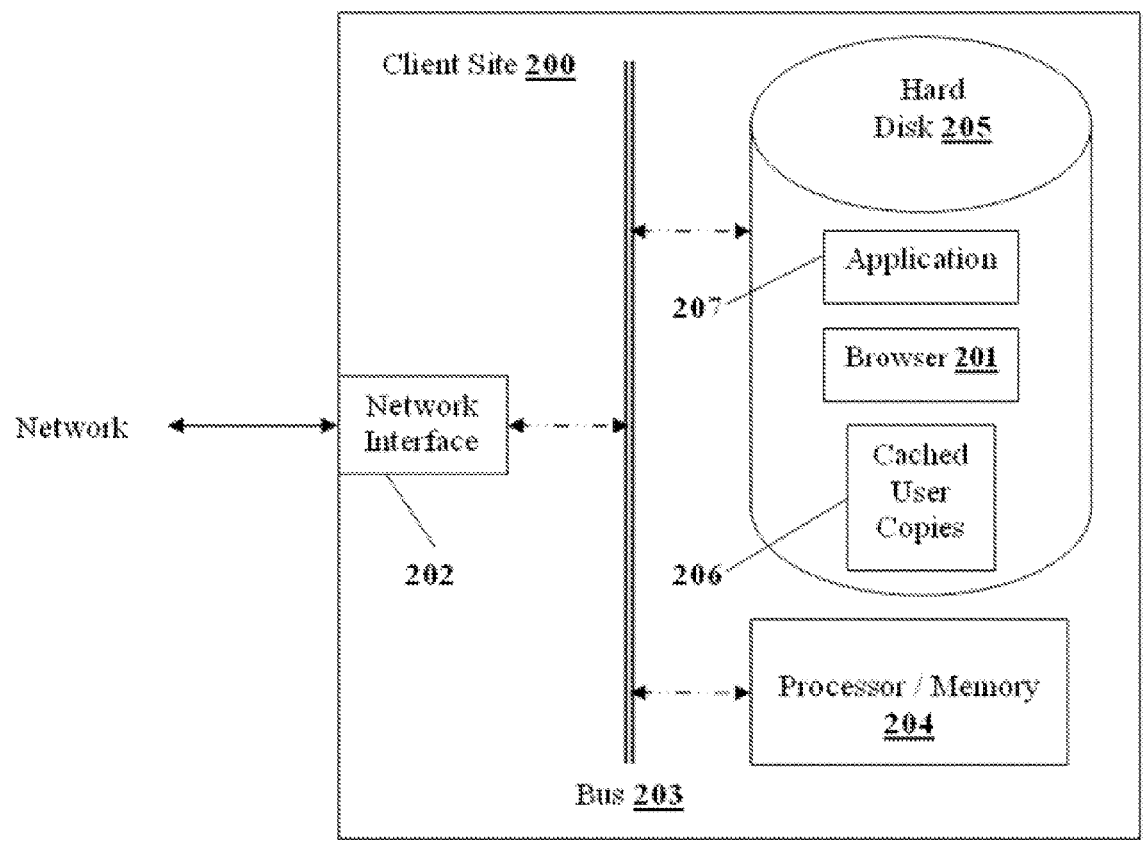
FIG. 2 illustrates an example of a client architecture embodiment.

Referring now to FIG. 2, the client sites 200 may include a web browser 201, such as the Internet Explorer® browser by Microsoft®, Firefox® browser by Mozilla®, Safari® browser by Apple® or any other suitable browser, a network interface 202, an internal bus 203, processor(s) and memory(ies) 204 and a hard disk 205. The web browser 201 may be stored on the hard disk 205 or other memory device of the client sites 200. When the client sites 200 obtain web pages, they generally request the web pages and/or web content from the host web servers 104 using a URL or other address. Client sites may obtain web pages as requested by their human operators. In the alternative, or in addition, the client sites may automatically request web pages or other content in response to a request or list provided from a central source, for example from server 101. Upon receiving the data from the host web servers 104 specified by the URL or other address, the web browser 201 may create cached user copies 206, or backups of the web pages and/or web objects in a private file system accessible to each client site.

A search engine administrative site, such as server 101, may automatically identify host sites suspected of providing masked web pages to search indexing agents, and thereby to reduce the amount of content that needs to be screened for page masking errors. This might be done using a statistical filtering process. For example, certain hosts may be trusted and known to never engage in content masking in response to search index requests. Pages from these trusted hosts may be eliminated from prospective candidate sources of masked page errors. Of the remaining sources, analysis may reveal patterns of masked page errors that regularly occur with certain keywords. For example, it may be learned that over the past 30 day period, the top 100 search results for the terms "mortgage loan" contained 10% masked results, while for the next 100 results, the masked error rate was 2%. Thus, based on results such as this an automatic quality control agent might check and correct more highly-ranked results for certain popular keywords, using the technology disclosed herein, while ignoring masked errors having a ranking lower than a selected threshold, for example, ranked lower than the first 100 results, to limit resource allocation to correction of the most highly-ranked masked page errors. A quality control agent may therefore prepare requests identifying host URL's to check for page masking by comparison with cached user copies, and communicate such requests to participating clients.

A program 115, similar to a crawler, may be executed in conjunction with the server agents 113 on the server 101 to request the cached user copies 206 of web pages from the client sites 200. Each cached copy may be identified by a corresponding host URL. The cached user copies 206 may be stored on a hard disk 205 or other memory device on the client sites 200. As such, the cached user copies 206 are not accessible using only the host URL, because the host URL indicates the original host location and not the location of the cached copy. In addition, the cached user copies 206 may be protected by a firewall or may be password protected. Therefore, the cached user copies are generally not publicly accessible using the host URL. This is in contrast to the web pages available from the host web servers 104, which are generally freely available on the World Wide Web using the corresponding host URLs. Faced with cached user copies behind a firewall or password protected, the application 207 may request access to the cached user copies 206 from the client sites 200. The application may identify specific copies using a host URL, which the client may translate as indicating a specific copy. In the alternative, or in addition, the application may request and receive all cached copies located on a particular client or clients.

In another arrangement, the server agent may prompt the client sites 200 to download an application 207. By agreeing to download the application 207, the client sites 200 allow the application 207 access to the cached user copies 206 stored on the client sites 200. Incentives may be provided to encourage clients to download application 207, such as access to free or discounted on-line services, merchandise coupons, cash payments, or other benefits. The application 207 may be stored on the hard disk 205 or other memory device of the client sites 204. The application 207 is configured to transmit the cached user copies 206 to the server 101 for indexing. Alternatively, the application 207 may be configured to summarize the cached user copies 206 before transmitting the summarized cached user copies to the server 101. The client application 207 may also be used to request and cache a web page hosted at a specific URL designated by the server 101. However, as this may be viewed as operating a disguised indexing agent, such functionality may be designed out or limited to rare circumstances. It is anticipated that, given a sufficient number of participating clients, there should be little or no need to request specific pages. This is because page masking errors should be much more frequent with popular URL's, which are correspondingly likely to be accessed by at least some of the clients without specifically directing the clients to do so. After the cached user copy 206 is obtained, the client application may provide the copy or a summary thereof to the server 101 as previously described.

Figure 3:
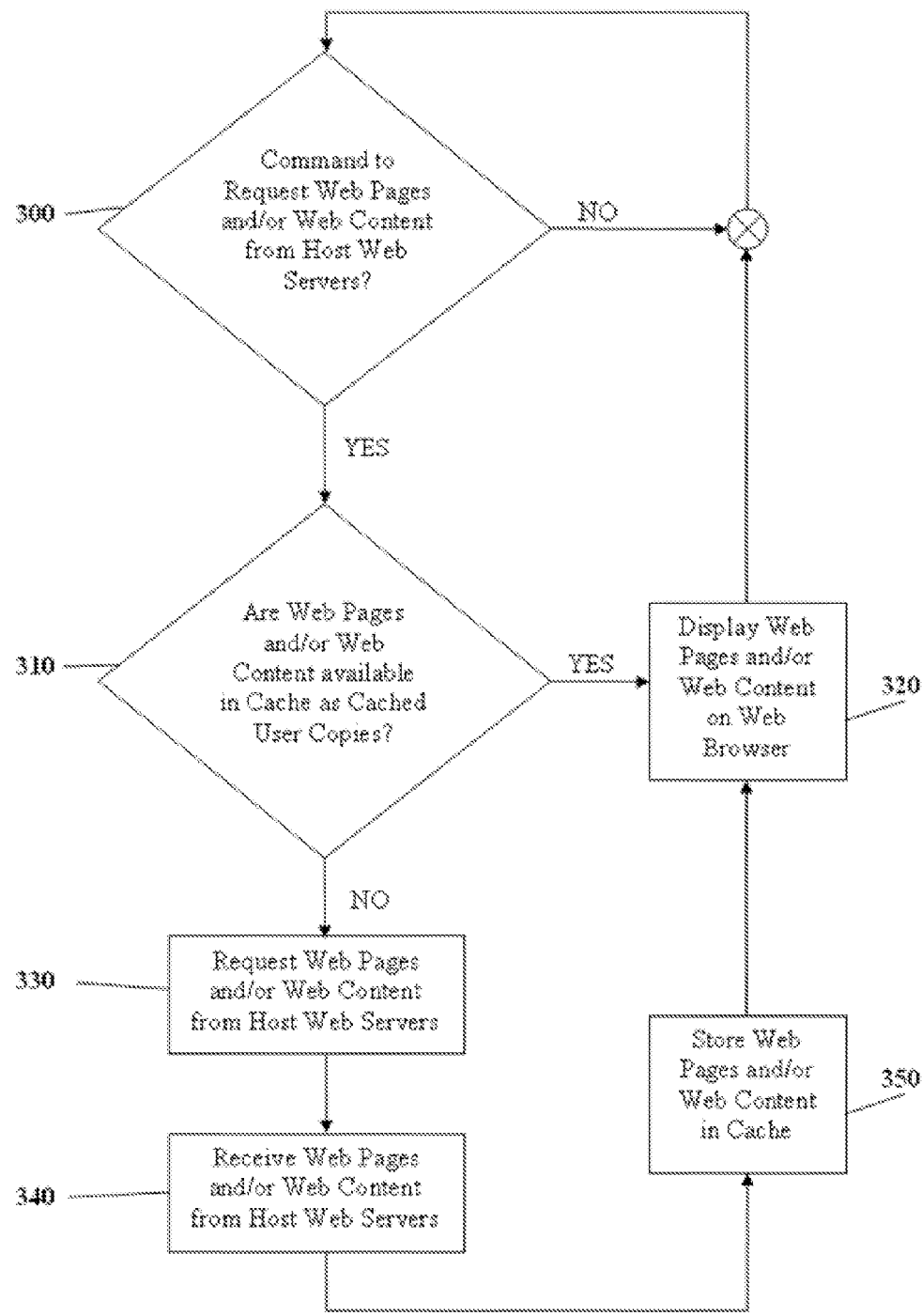
FIG. 3 illustrates an example of a process by which client sites (user sources) obtain and store cached user copies of web pages and/or web content.

FIG. 3 illustrates a process by which a client site may receive cached user copies of web pages and/or web content. At 300, a client site may continuously check to verify if there exists a command to request web pages and/or web content from host web servers. Once the client site verifies there is such a command, at 310, the client site may determine whether the request identifies web pages and/or web content that already exists on the client site as cached user copies. If the client site already has the cached user copies, at 320, the client site may display the cached user copies on a web browser. If the client site does not have the requested cached user copies, at 330, the client site may request the web pages and/or web content from the host web servers. At 340, the client site may receive the web pages and/or web content from the host web servers. At 350, the client site may store the web pages and/or web content in a cache. Optionally, at 320, the client site may display the web pages and/or web content on the web browser.

Accordingly, the client sites 200 may comprise a secondary source for web pages and web content, having received the web pages and web content from the host web servers 104 and cached them in the client site's 200 memory. These cached user copies 206 of web pages and/or web content should not comprise masked content, because the host web servers 104 should not be able to identify the client sites 200 as search indexing agents and will therefore not supply masked content to them. The cached copies may therefore be used lessen masked web page content indexing errors by comparing the cached pages or index data from cached pages to pages or index data from corresponding host pages, or by using the cached pages or index data in lieu of host data to build the search index. An indexing process may therefore use cached pages when available to identify masked content and to correct index data based on masked content that is thereby identified. A search index 107 for a search engine 103 composed of this data may therefore provide search results 116 that contain far fewer errors than existing search indexes for search engines. This in turn may result in more useful, focused search results for the end users.

Figure 4:
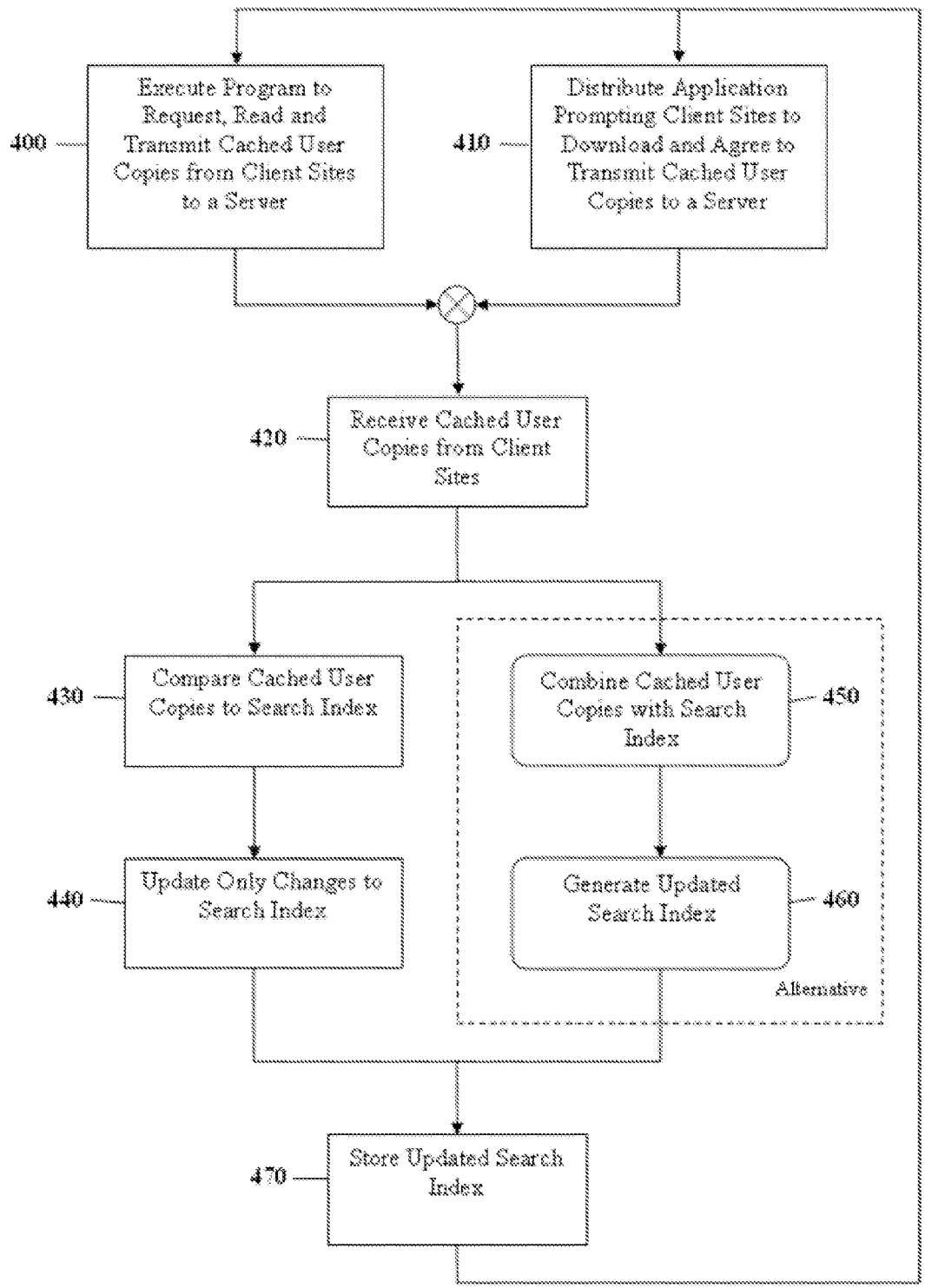
FIG. 4 illustrates an example of an indexing process.

FIG. 4 is a flowchart illustrating a method according to an example of an embodiment. At 400, a program is executed that requests, reads and transmits cached user copies of web pages and/or web content from client sites to a server. This program may be similar to a crawler, but with the important difference that it obtains cached user copies from client sites that are not hosts. In other words, these client sites have obtained their cached user copies from the host web servers themselves, and the server obtains the cached user copies not from the host web servers, as does a crawler, but from non-host client sites.

At 410, optionally in parallel with 400, an application may be distributed to the client sites, prompting the client sites to download the application and agree to allow the application to transmit cached user copies of web pages and/or web content to the server. Either one of these steps for obtaining cached user copies may be repeated periodically, or at any other beneficial time.

At 420, the cached user copies may be received by the server. Once received, the server may store the cached user copies in an attached database or may process the cached user copies prior to storing the processed data. As an option, the server and/or server agent may summarize the cached user copies and provide a shortened version of each cached user copy. The summarized cached user copies may comprise, for example, URLs, network addresses and key terms. As another option, the server and/or server agent may aggregate the cached user copies, wherein the aggregated cached user copies are cached user copies from multiple client sites.

At 430, the cached user copies may be compared to a search index, and at 440, only the changes to the search index may be updated to the search index. Alternatively, at 450, the cached user copies may be combined with the search index, and at 460, an updated search index may be generated. The indexing function may also include ranking the cached user copies or summarized data to alleviate the burden of ranking from the search engine. At 470, the updated search index may be stored in the database for use by the search engine in obtaining search results for end users.

As another option, the application downloaded on the client sites may perform the summarizing and/or aggregating functions rather than the server. This could be beneficial for the server, freeing up network resources and processing commands.

Figure 5:
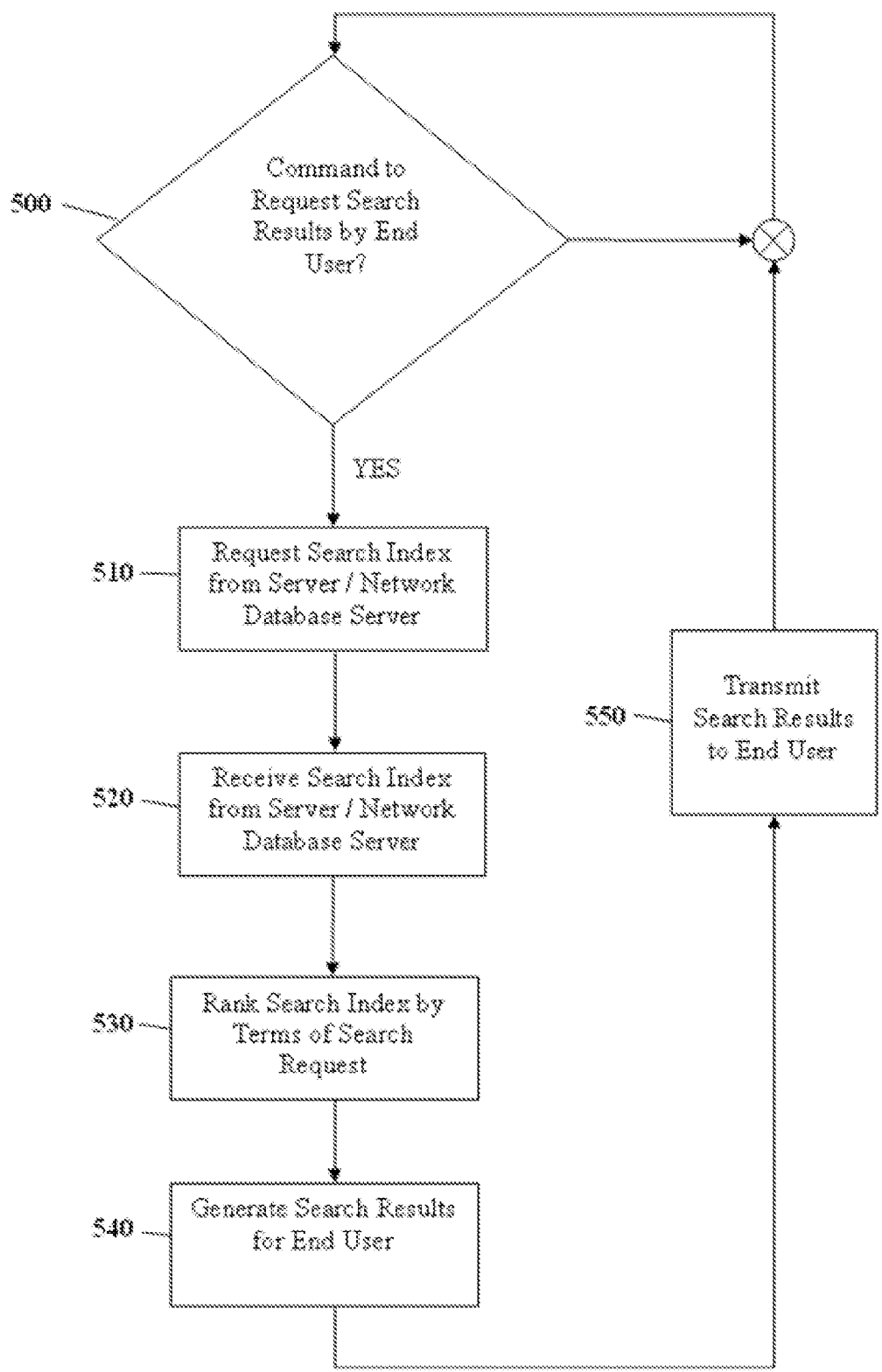
FIG. 5 illustrates an example of a process by which search engines receive search requests and transmit search results to end users.

FIG. 5 is a flowchart illustrating the process by which a search engine may generate and transmit search results to an end user. At 500, a client site may continuously check to determine if there exists a command to request search results by the end user. If there exists a request for search results, at 510, the search engine requests a search index from the server. As before, the search index may be located on the database of a local database server or on the database of a network database server. In the latter case, the search engine may request the search index directly from the network database server.

At 520, the search engine may receive the search index from either the server or the network database server. As stated above, the search index received by the search engine may already be ranked according to relevant criteria. For example, the server 101 or server agent 113 from FIG. 1 may rank the search index based on a counted number of duplicate cached user copies it receives. This may benefit the search results by obtaining data on popularity of certain web pages and/or web content. At 530, the search engine ranks the search index by the terms of the search request, obtaining the search results. The search engine may rank the search index by relevant criteria, including the number of hits on each web page, the key terms on each web page and various other criteria. At 540, the search engine generates the search results for the end user. The search results may include the URLs of the web pages. At 550, the search engine transmits the search results to the end user in a format viewable on the end user's web browser or other device.

Methods disclosed herein, for example, methods 400 or 500, may be encoded as program instructions on a computer-readable medium. For example, suitable instructions for performing these methods may be encoded on media such as a hard drive or other memory of server 101 in FIG. 1. In the cast of distributable applications, instructions may be encoded on a computer-readable medium operable on client sites 105.

Figure 6A:
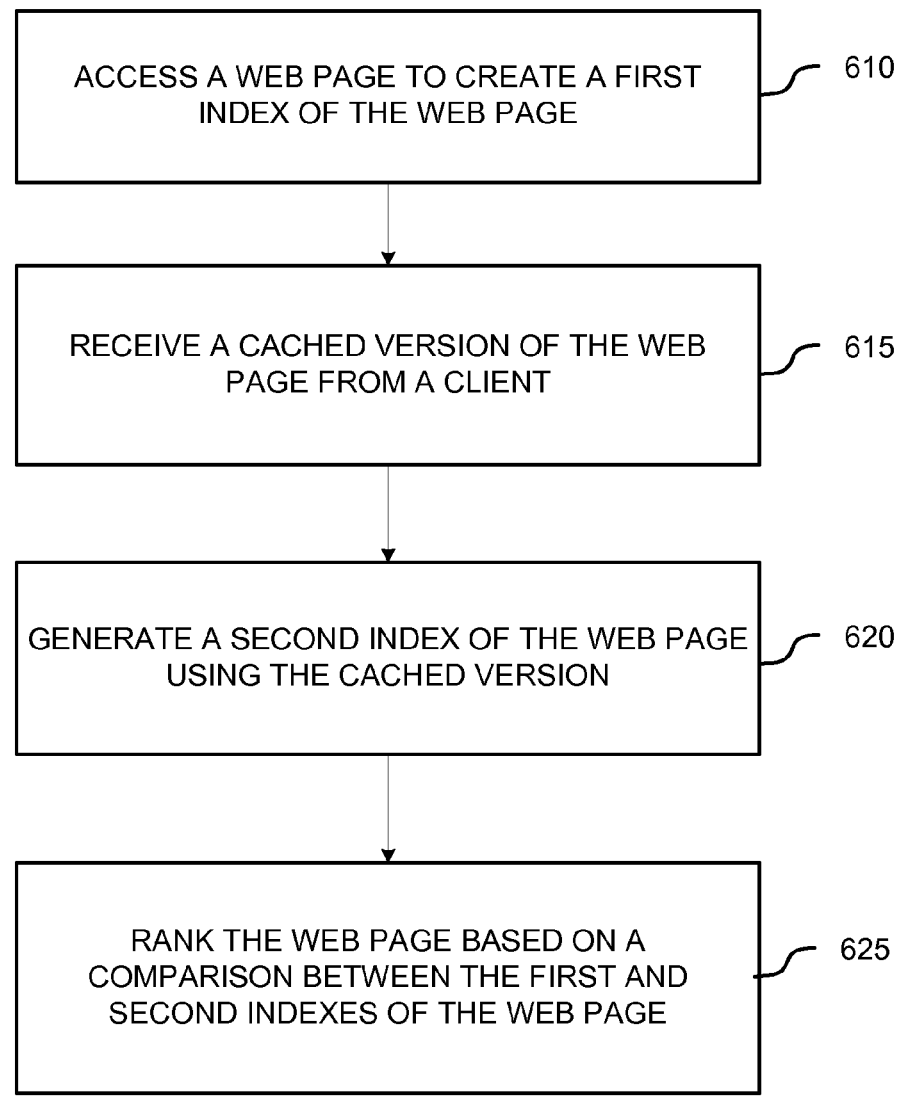
FIGS. 6A-6B illustrate examples of processes for indexing a web page.

FIG. 6A illustrates an example web page indexing process 600 according to one embodiment of the present invention. Referring now to FIG. 6, process 600 starts at 610 where a web page is accessed and an index or an index information of the web page is created. The index or the index information (a portion of an entire index) may be created by analyzing information on the web page in chunks. For example, a web page may be indexed by paragraphs on the web page or by the entire content of the web page. The level of granularity may be adjusted to suit the needs of the application and the user. Alternatively, a full-text index may be employed. A full-text index creates an index on every word contained on the web page.

An index or index information may also be created by hashing a portion or the entire content of the web page. Various hashing algorithms that are well known in the industry may be used to generate the index information. For example, an index information may be created using information embedded in the <META> tags of web pages. The <META> tag may contain information about the web page such as its subject, content, author, date, and keywords. However, web site administrators may manipulate a web page <META> tag when a crawler identified itself to the web site as a crawler or spider to provide misleading <META> tags or other misleading information that differ from what will be provided in response to non-indexing requests. Thus, as described below, another index or index information may be generated using cached copy of the web page. Cached copies of web pages as described herein should be collected by ordinary users of the Internet and not by an indexing agent, thus such pages will not contain <META> tags or other information that differs from what will be provided to non-indexing requests.

At 615, a cached copy of the web page is received from a remote client. The remote client may comprise any computer on the network with the capability to view web pages in on the Internet, operating a browser application and not operating a web crawler or the like. The remote client may be used to view web pages using a conventional web browser such as Internet Explorer® or Firefox®. In one embodiment, instead of receiving the entire cached copy of the web page, a summary of the cached copy is received from the client. The summary may contain index information such as relevant terms, frequently repeated terms, subject headings, internet address, URL, etc.

At 620, a second index of the web page may be generated using the received cached copy of the web page. By using the user's cached copy, the second index of the web page may more accurately index the actual content of the web page than an index generated by the web crawler. Typically, web site's administrators have the capability of sending false pages to web crawlers in order to manipulate the search results. Thus, by using cache copies of the web page from one or more actual users, the administrators' ability to manipulate the search result is substantially taken away or eliminated.

At 625, the web page may be ranked based on a comparison between the index generated using web page information obtained by the crawler (crawler index) and the index generated using web page information obtained from the cached copy or copy of the web page (cached index) from one or more clients operating a web browser. If there are appreciable differences between the crawler and cached indexes, then the rank may be based entirely on the cached index, where there is a cached index available. In certain circumstances, where a cached copy of a web page is not available, then the rank may be based entirely on the crawler index. If there are differences between the two indexes, the rank may be based on a combination of both indexes or based on their differences. Once the rank is generated, a search result is produced and displayed to a client or user.

In one embodiment, the cached index may be generated using a summary of the cached copy of the web page. Alternatively, the cached index is generated using an aggregated summary of multiple versions of the cached copy of the web page from one or more clients. An accuracy factor may be generated based on the number of available cached versions and the number of available clients that provided the cached copy of the web page. The accuracy factor is high if the numbers of available cached versions and cached page providers are high. The inverse would yield a low accuracy factor. In one embodiment, the rank of the web page is additionally based on the accuracy factor.

Figure 6B:
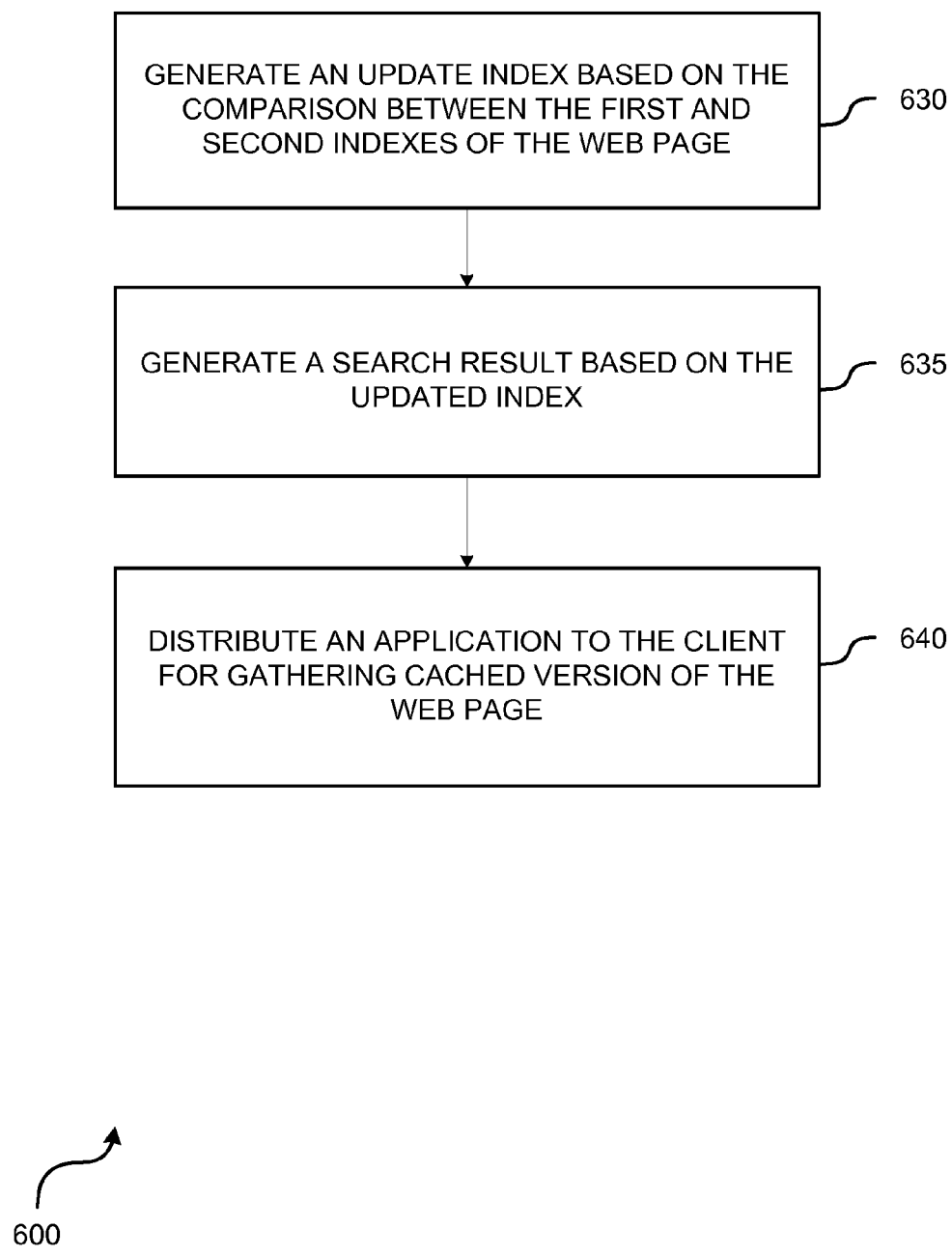

Referring now to FIG. 6B, method 600 continues at 630 where an update index based on the comparison between the crawler index and the cached index. The update index may be an entirely new index. Alternatively, the update index is merely an update to the original crawler index. At 635, a search result is generated based on the updated index. Once the search result is generated, it is sent to the remote clients.

At 640, an application may be distributed or uploaded to a client system for gathering cached copy of the web page on the user's computer system. The application may be configured to transmit the cached copies and/or versions of the web page to the server for indexing. Alternatively, the application may be configured to summarize the cached copies before transmitting the summary to the server. The application may also be used to request and cache a web page hosted at a specific URL designated by the server. After the cached user copy is obtained, it may be provided to the server as previously described.

Figure 7A:
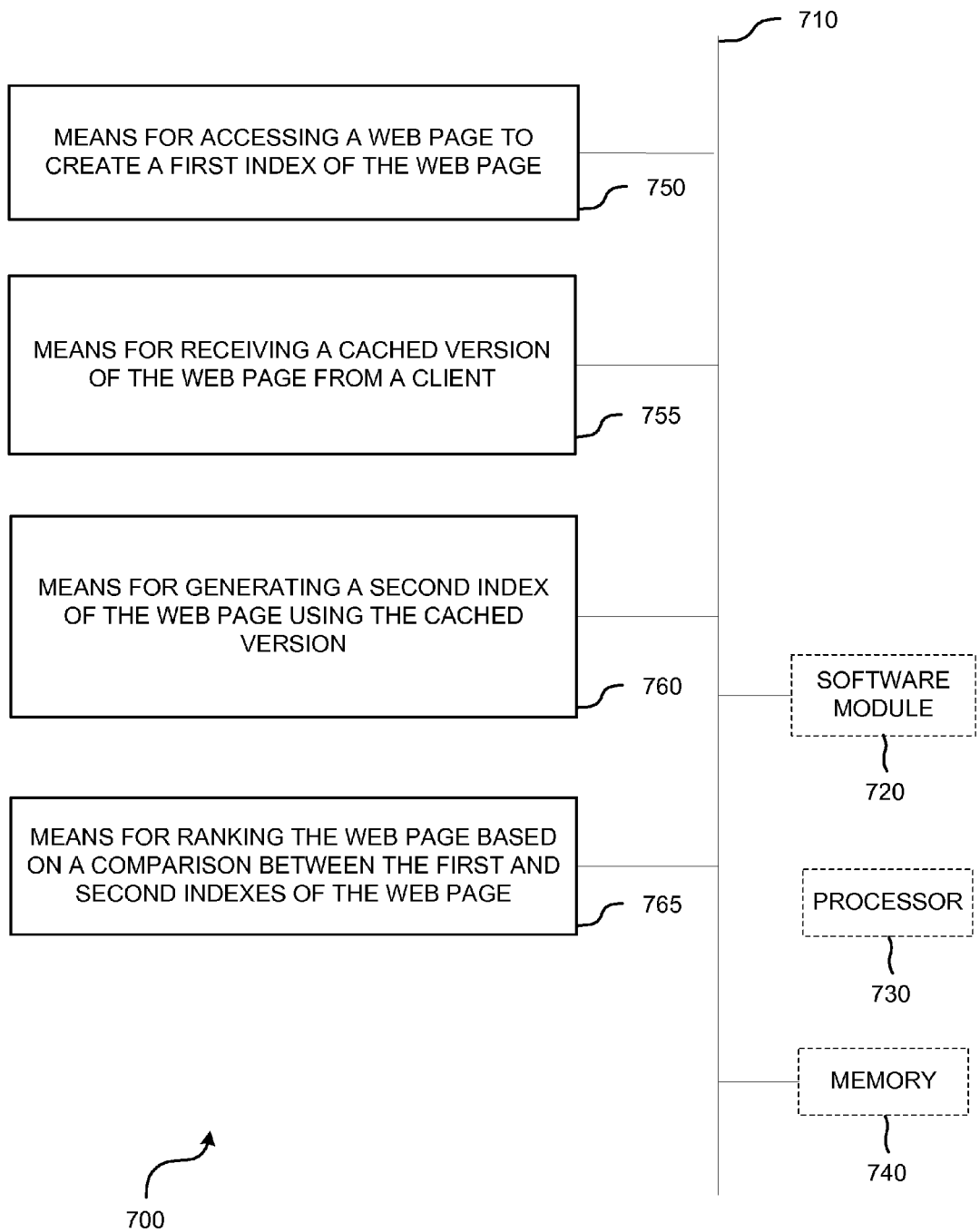
FIGS. 7A-7B illustrate an example of a computer system in which the indexing of web pages can be implemented.

FIG. 7A illustrates an example of an apparatus or system 700 for indexing a web page according to one embodiment of the present invention. As illustrated, apparatus 700 may comprise a means for accessing a web page to create a first index information of the web page, such as a search indexing agent operating on an indexing server. A means 755 for receiving a cached copy of the web page or summary thereof from a client may comprise the search indexing server operating an application to obtain cached web pages or summaries from clients, a plurality of client applications at distributed client sites configured to push cached copies or summaries to the indexing server, or a combination of the foregoing. A means 760 for generating a second index information of the web page using the cached copy of the web page may also be included in system 700, comprising, for example, an indexing application operating on an indexing server, using the cached copies or summaries thereof from one or more clients as input. The first index information and the second index information may comprise a portion or an entire index normally generated in the process of indexing a web page. It should be noted that an entire portion of the index need not be generated to implement the present invention. Additionally, system 700 may also include a means 765 for ranking the web page based on a comparison between the first index information and the second index information, comprising a search engine application operating on a server, using both the first index information and the second index information as input to provide ranked search results in response to user queries. This application may be configured to operate as described hereinabove.

Figure 7B:
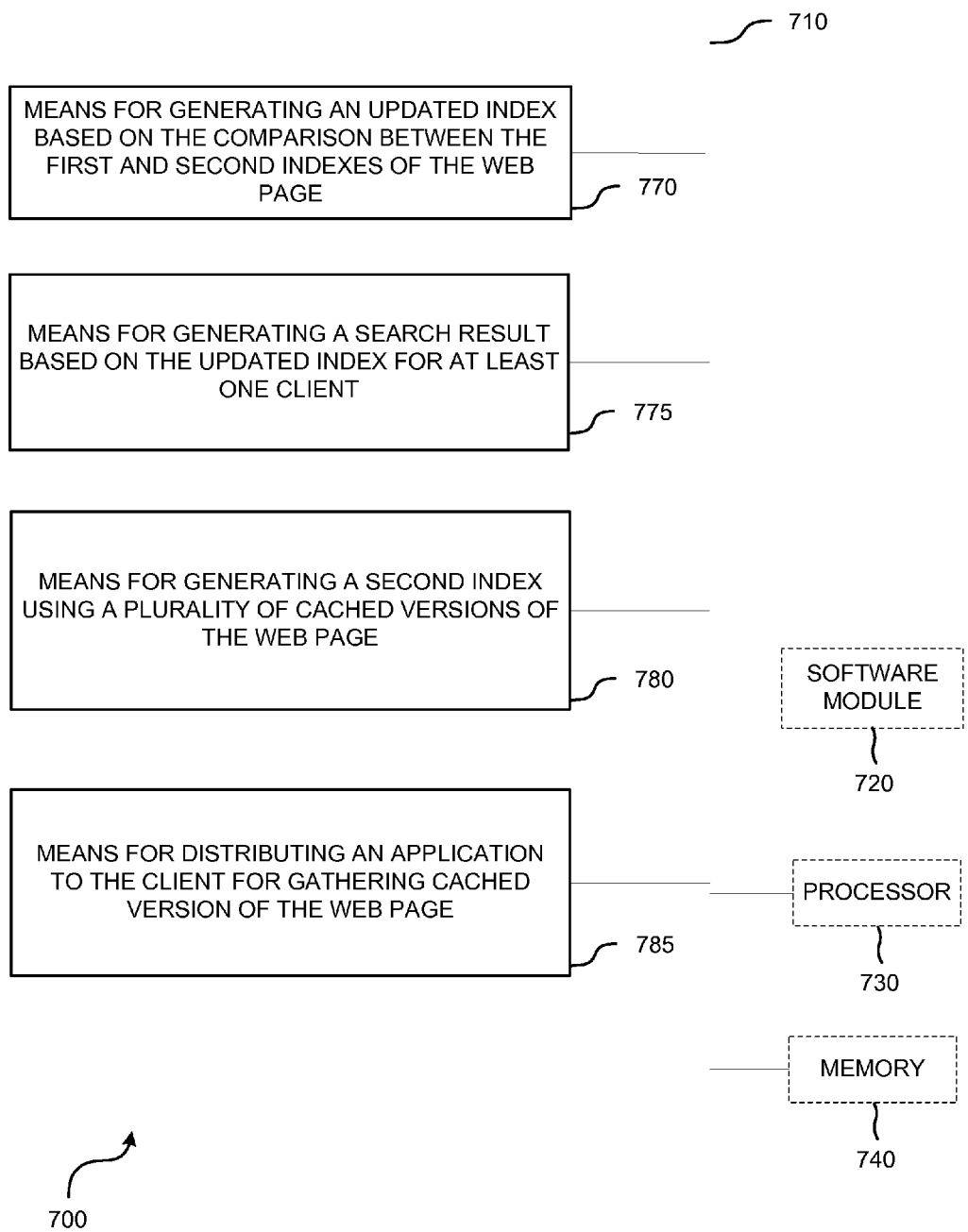

Referring now to FIG. 7B, system 700 may, in the alternative or in addition, include a means 750 for generating an updated search result based on the comparison previously generated. Means 750 may comprise comprising a module of a search engine application, or a separate application operating on a server, using comparison data between the first index information and the second index information and a first ranked search result as input to provide updated ranked search results in response to user queries. A means 755 for generating a search result and for transmitting the result to a remote client or user may also be included in system 700, comprising the search engine application operating on a server, formatting and transmitting ranked search results in response to user queries. Further, system 700 may include a means 760 for generating the second index using a plurality of cached copies of the web page, comprising, for example, an indexing application operating on an indexing server, using the cached copies or summaries thereof from multiple clients as input and optionally capturing data concerning the popularity of a cached copy to use in ranking search results. System 700 may further comprise a means 765 for distributing an application that permits the server to receive cached copies of web pages from a client system, comprising an interactive interface application operating on a server and configured to transmit the application to requesting clients in response to client requests.

As shown in FIGS. 7A and 7B, system 700 and the depicted means may include a processor module 530 having at least one processor, in the case of system 700 configured as a computing device, rather than as a processor. Processor 730, in such case, may be in operative communication with means 750-765, and components thereof, via a bus 510 or similar communication coupling. Processor 730 may effect initiation and scheduling of the processes or functions performed by means 750-765, and components thereof, and may be considered as a component of such means.

In related aspects, system 700 may include a software module 720 which may house search engine 103, hosting software, application 207, and other software for implementing steps 750-765.

In further related aspects, system 700 may optionally include a means for storing information, such as, for example, a memory device/module 740. A computer-readable medium or memory device/module 740 may be operatively coupled to the other components of apparatus 700 via bus 710 or the like. The computer readable medium or memory device 740 may be adapted to store computer readable instructions and data for implementing the processes and functions of means 750-765, and components thereof, or processor 730 (in the case of system 700 configured as a computing device) or the methods disclosed herein.

In yet further related aspects, the memory module 540 may optionally include executable code for the processor module 530 to perform processes 750 through 765. One or more of 750-765 may be performed by processor module 730 in lieu of or in conjunction with the means 750-765 described above.

Figure 8:
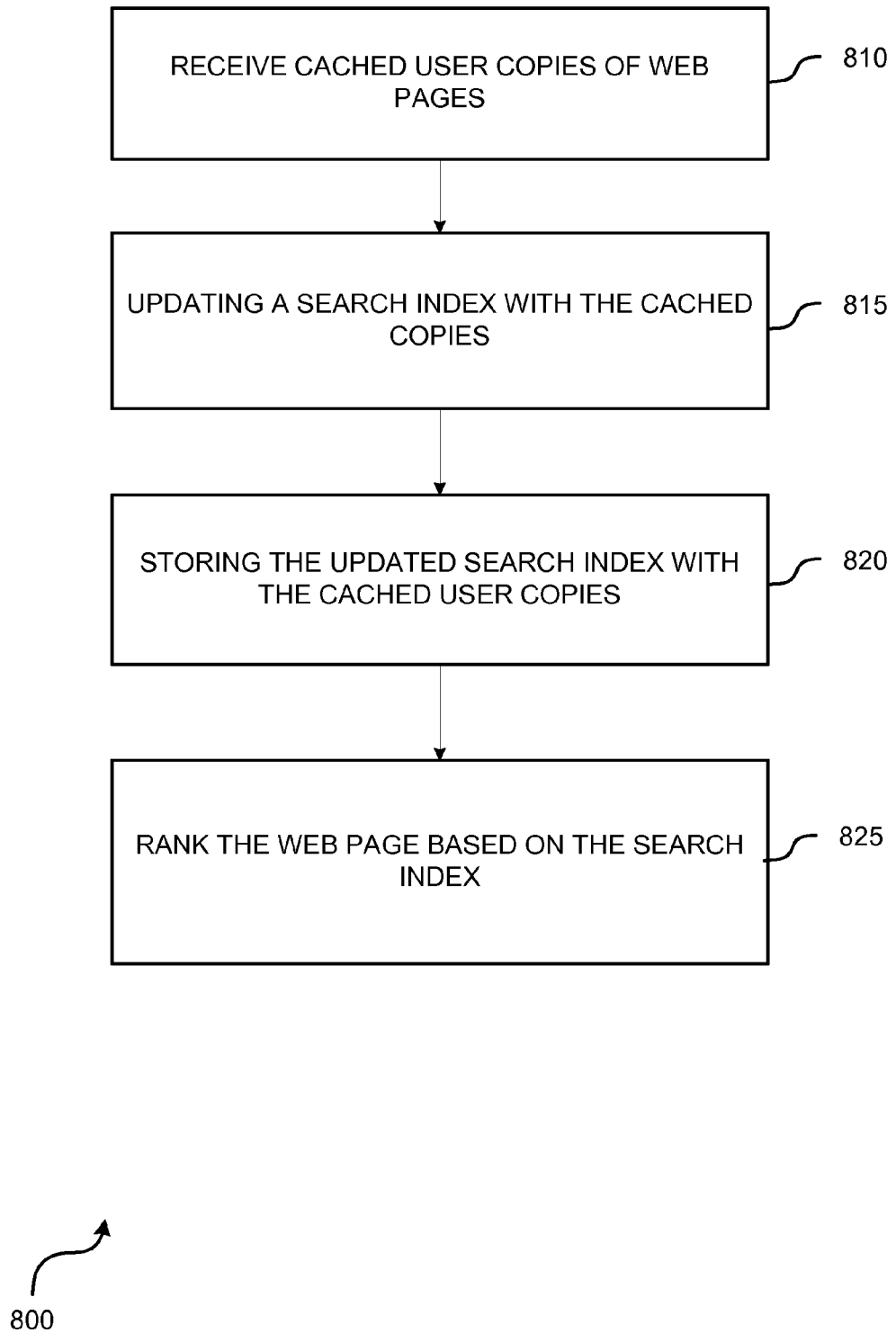
FIG. 8 illustrates an example of a process for indexing a web page.

FIG. 8 illustrates an example indexing method 800 according to one embodiment of the present invention. Referring now to FIG. 8, method 800 starts at 810 where cached of user copies of web pages are received by a server operating an indexing application. At 815, the server updates a search index with the cached copies of the web pages. At 820, the updated search index is stored by the server with the cached copies of web pages from the user's computer system. At 825, the web page is ranked using the search index and transmitted to a client for display output, or output at the server.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Additionally, with regard to flow diagrams, operational descriptions and method claims, the order in which the operations are presented herein shall not mandate that various embodiments be implemented to perform the recited functionality in the same order unless the context dictates otherwise. The breadth and scope of the present invention should not be limited by any of the above-described exemplary embodiments.

The invention claimed is:

1. A method comprising:
   accessing a first web page hosted at a network address using a server operating a web crawling application to create first index information for the first web page;
   receiving, at the server, second index information generated from a cached copy of a second web page, wherein the cached copy is not hosted at the network address and the second web page is previously received by a client via a browser application operated at the client in response to a request directed to the network address;
   comparing the first index information and the second index information to identify masked web page content; and
   ranking the first web page in a search results list generated at the server, based on the comparison between the first index information and the second index information, to reduce errors caused by the masked web page content.

2. The method of claim 1, further comprising:
   generating an updated index based on the comparison between the first index information and the second index information; and
   generating a search result based on the updated index for at least one client.

3. The method of claim 1, wherein the network address comprises a Uniform Resource Locator (URL).

4. The method of claim 1, wherein generating the second index information further comprises summarizing the cached copy of the second web page, wherein the cached copy includes a uniform resource locator and one or more key terms.

5. The method of claim 1, wherein generating the second index information further comprises aggregating a plurality of cached copies of the second web page from one or more remote clients.

6. The method of claim 5, further comprising measuring popularity for the first web page by counting a number of the cached client copies received.

7. The method of claim 5, further comprising distributing an application to the client, the application configured to operate on computer systems of the client and to periodically transmit the cached copies to a server.

8. The method of claim 7, wherein the application is further configured to summarize the cached copies prior to transmission.

9. The method of claim 7, wherein the application is further configured to aggregate the cached copies prior to transmission.

10. The method of claim 7, wherein the application is further configured to generate the second index information from the cached copies.

11. A system for indexing web pages comprising:
   means for accessing a first web page hosted at a first network address to create a first index information of the first web page;
   means for receiving a cached copy of a second web page at a client, wherein the cached copy is not hosted at the network address, and the client receives the second web page in response to a browser request directed to the network address;
   means for generating a second index information of the second web page using the cached copy;
   means for comparing the first index information and the second index information to identify masked web page content; and
   means for ranking the first web page based on the comparison between the first index information and the second index information, to reduce errors caused by the masked web page content.

12. The system of claim 11, further comprising:
   means for generating an updated index based on the comparison between the first index information and the second index information; and
   means for generating a search result based on the updated index for at least one client.

13. The system of claim 11, wherein the network address comprises a Uniform Resource Locator (URL).

14. The system of claim 11, wherein means for generating the second index further comprises summarizing the cached copy of the second web page, wherein the cached copy includes a uniform resource locator and one or more key terms.

15. The system of claim 11, wherein means for generating the second index information further comprises aggregating a plurality of cached copies of the second web page from one or more remote clients.

16. The system of claim 11, further comprising means for distributing an application to the client, the application configured to operate on computer systems of the client and to periodically transmit the cached copy of the second web page to a server.

17. A system for indexing web pages comprising:
a crawler to access a first web page hosted at a network address to create a first index information of the first web page;
a server to receive second index information generated from a cached copy of a second web page, wherein the cached copy is not hosted at the network address, and the second web page is obtained by a browser application operating on a remote client using the network address;
an index generator to generate a second index information of the second web page using the cached copy;
an application to compare the first index information and the second index information to identify masked web page content; and
an analyzer to rank the first web page based on the comparison between the first index information and the second index information, to reduce errors caused by the masked web page content.

18. The system of claim 11, wherein the index generator generates the second index information by summarizing the cached copy of the web page, and the cached copy includes a uniform resource locator and one or more key terms.

19. The system of claim 11, wherein the second index information further comprises an aggregate of a plurality of cached copies of the second web page from one or more remote clients.

20. A method for assisting a server to index web pages, the method comprising:
distributing an application to a client, the application configured to operate on the client and to cause the client to periodically transmit a cached copy of a first web page to a server, wherein the client obtains the first web page using a browser application accessing a specified web address and does not host the first web page at the web address;
generating a first index information based on the cached copy of the first web page received from the client;
comparing the first index and a second index, generated from a sample of a second web page hosted at the specified web address and obtained by a web crawling application, to identify masked web page content; and
updating a search index based on the comparison between the first index and the second index, to reduce errors caused by the masked web page content.

21. The method of claim 20, further comprising sending an instruction to the application to cause the application to access the first web page at the specified web address and to send the cached copy from the client to a server.

22. A method for avoiding masked web page content indexing errors, the method comprising:
receiving cached user copies of web pages from client sources at a server, wherein the cached user copies are identified by respective URLs that designate network addresses other than the client sources and are obtained by browser-initiated requests;
comparing the cached user copies to corresponding crawler copies obtained by a web crawler application and also identified by the respective URLs to identify masked web page content;
updating a search index with the cached user copies, to reduce errors caused by the masked web page content; and
storing the updated search index, wherein the updated search index is used to generate search results for at least one client.

23. The method of claim 22, wherein the respective URLs designate corresponding hosts providing the crawler pages as masked pages different from corresponding cached user copies.

24. The method of claim 22, wherein updating the search index further comprises summarizing the cached user copies, wherein the summarized cached user copies include uniform resource locators and key terms.

25. The method of claim 22, wherein updating the search index further comprises aggregating the cached user copies from multiple client sources.

* * * * *